July 12, 1932.　　A. P. BRUSH ET AL　　1,867,207
MOTOR CAR CONSTRUCTION
Filed July 28, 1928　　3 Sheets-Sheet 3
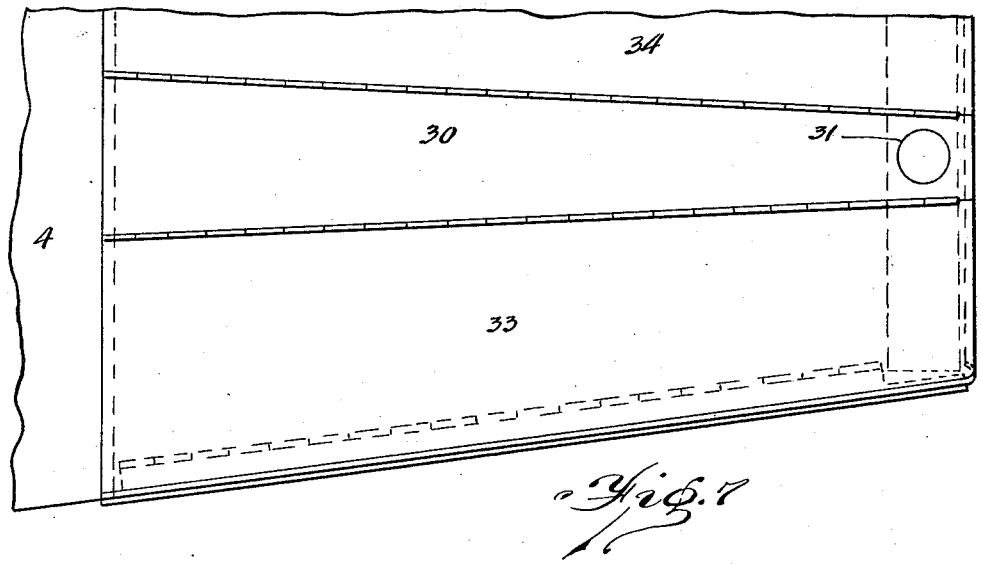
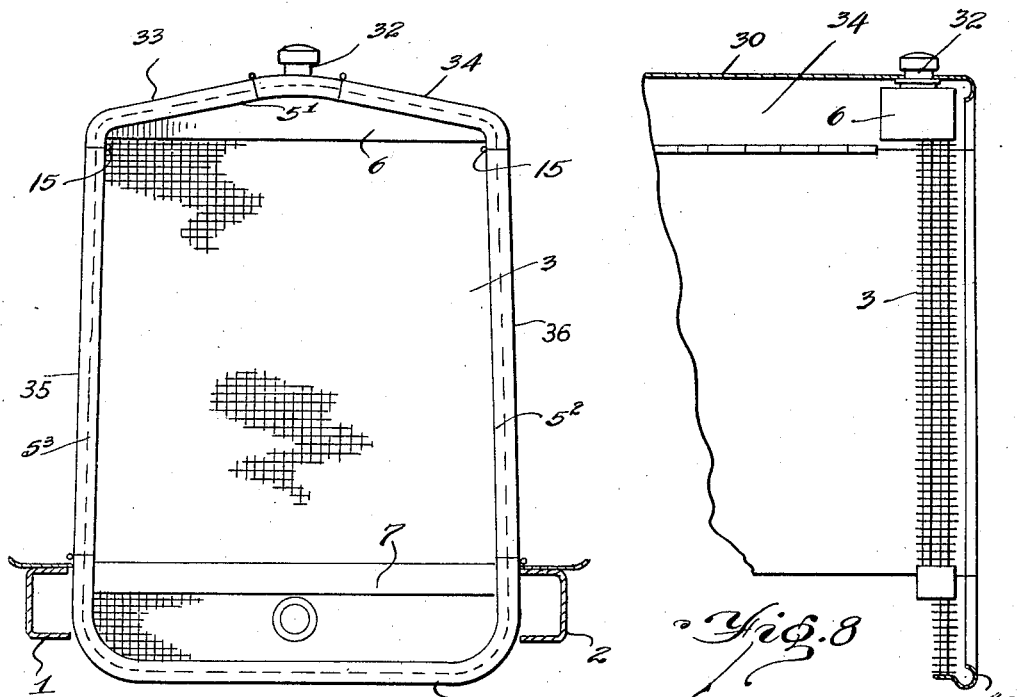
INVENTORS
Alanson P. Brush
William A. Brush
BY
ATTORNEYS.

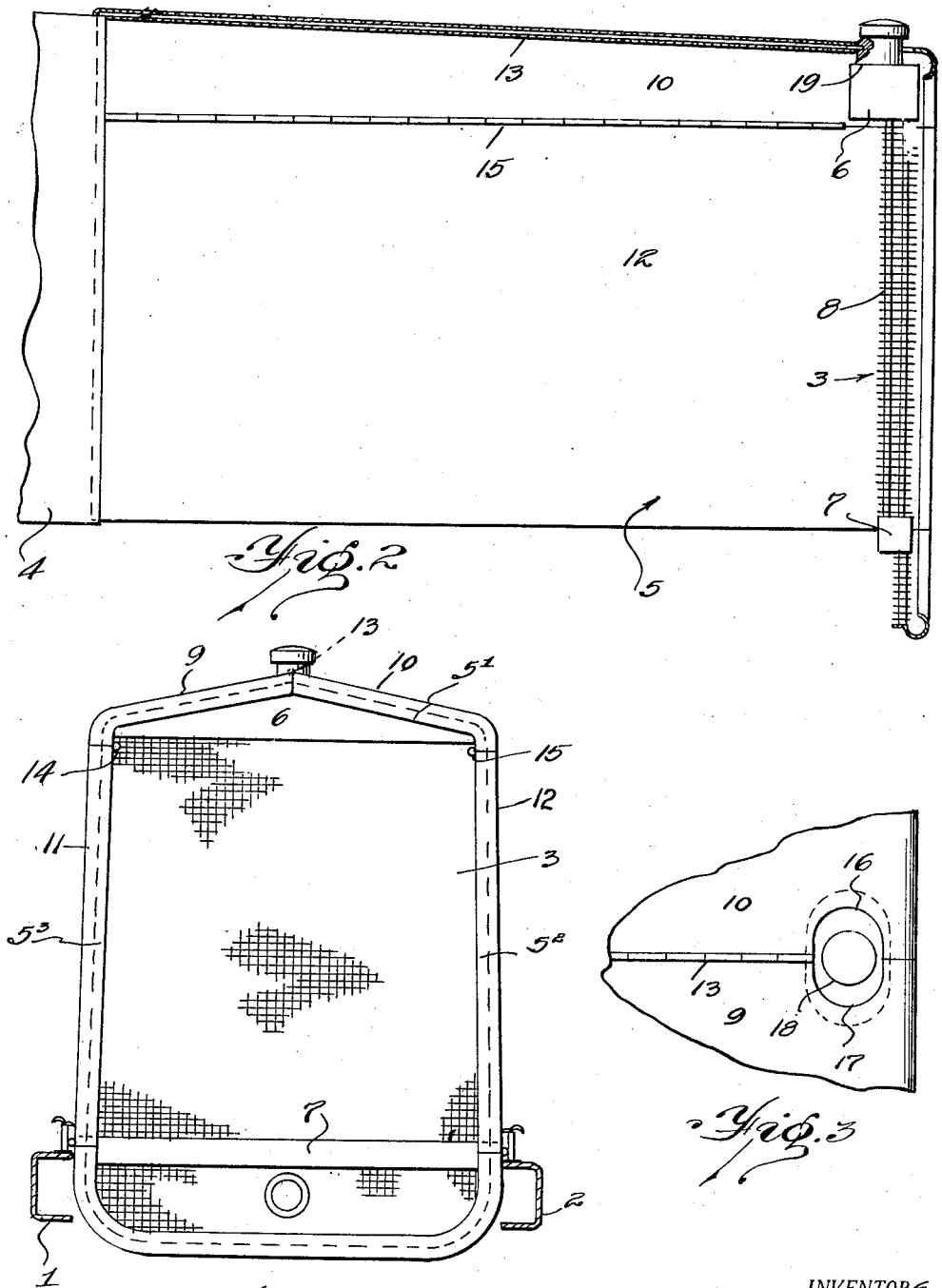

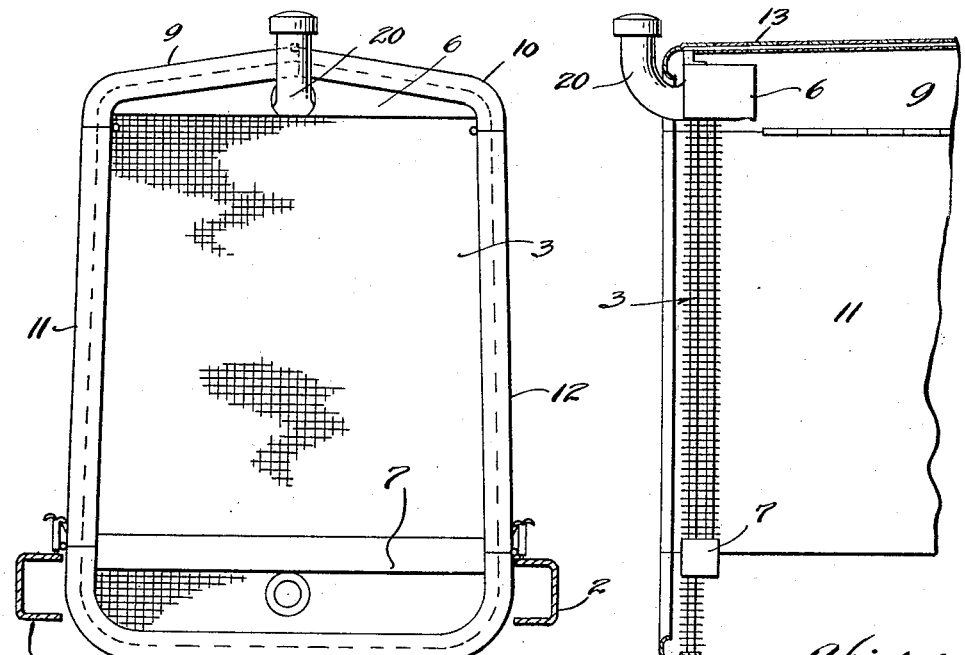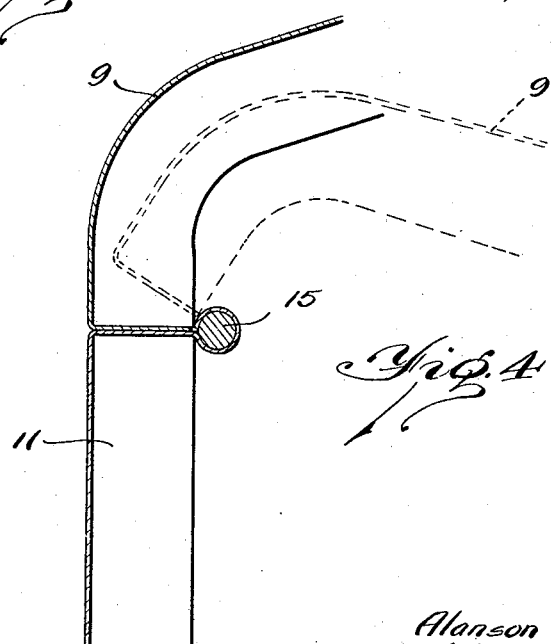

Patented July 12, 1932

1,867,207

UNITED STATES PATENT OFFICE

ALANSON P. BRUSH AND WILLIAM A. BRUSH, OF DETROIT, MICHIGAN

MOTOR CAR CONSTRUCTION

Application filed July 28, 1928. Serial No. 295,965.

This invention relates generally to hood constructions for motor vehicles, and consists of certain novel features of construction, combinations and arrangements of parts that will be hereinafter more fully described and particularly pointed out in the appended claims.

Usually the hood of a motor vehicle extends between the cowl at the forward end of the vehicle body and the radiator shell or casing at the forward end of the motor or engine, thereby inclosing the motor therebetween. With such constructions the radiator is framed in a shell that is separate from the hood and that extends around the radiator proper and inwardly in front of the radiator proper for a limited distance so as to expose to view only the front surface of the radiator through which the cooling air passes. With such assemblies it is customary to have the hood match the radiator shell or casing, however, in practice it has been found that this matching requires considerable skill, time, labor and money for both manufacturing and assembling the respective parts. Moreover, if the assembling operations of the parts are improperly done, then such parts do not fit together properly and are unsightly.

To obviate all of the objectionable features just referred to incident to the matching of the separate radiator and hood, we have provided an assembly in which the hood is utilized as a radiator casing, and the ordinary radiator shell is eliminated. In the present instance the hood extends over and in advance of the radiator and is provided upon the front face of the radiator with inturned portions which overlap the marginal portions of the radiator and serve as a framing therefor. Thus the hood itself has portions enclosing and framing the radiator.

In the accompanying drawings—

Fig. 1 is a front elevation of an assembly embodying my invention.

Fig. 2 is a fragmentary vertical sectional view through the assembly.

Fig. 3 is a fragmentary top plane view of the construction shown in Fig. 2.

Fig. 4 is an enlarged fragmentary vertical sectional view through a portion of the hood shown in Fig. 2.

Fig. 5 is a front elevation similar to Fig. 1 but showing a slightly modified construction.

Fig. 6 is a fragmentary vertical sectional view through the construction shown in Fig. 5.

Fig. 7 is a fragmentary top plan view of another modified construction.

Fig. 8 is a vertical fragmentary sectional view through the construction shown in Fig. 7.

Fig. 9 is a front elevation of the construction shown in Fig. 7 and Fig. 8.

Referring now to the drawings—1 and 2 respectively are the longitudinal side rails of a motor vehicle chassis; 3 is a radiator on the chassis at the front end of said rails, 4 is a cowl at the forward end of a vehicle body carried by the chassis, and 5 is a motor hood extending from the cowl 4 over and in advance of the radiator 3. As shown the radiator has suitable upper and lower headers 6 and 7 respectively and the connecting tubes 8, but is entirely devoid of the usual shell or casing. With this construction the hood 5 serves as a casing for the top and sides of this radiator 3 and is provided at its forward end with inturned open return bent portions $5^1$, $5^2$ and $5^3$ that extend over the front face of and constitute a framing for the radiator 3.

In Figures 1 to 6 inclusive the hood 5 is formed of four longitudinally hinged sections 9, 10, 11, and 12 respectively, with the uppermost hinge connection 13 between the top sections 9 and 10 above and in a vertical plane with the longitudinal median line of the chassis, and with the top and side section hinge connections 14 and 15 respectively at opposite sides of the radiator. In Figures 1 to 4 inclusive the upper hinge connection 13 terminates short of the forward ends of the top sections 9 and 10 and the latter are provided immediately in advance of this hinge connection with inwardly opening transversely extending communicating slots 16 and 17 forming an elongated opening that receives the upstanding filler neck 18 of the radiator 3. As this opening extends transversely of the hood and is elongated in form, either section 9 or 10 may be raised without interfering with the filler neck 18. Preferably the neck 18 has an elongated enlargement 19 that normally closes the elongated opening formed by the slots 16 and 17 so that a neat appearance is provided when the hinge sections 9 and 10 are in closed positions.

In Figures 5 and 6 the filler neck 20 projects forwardly from the upper header 6 of the radiator 3. Thus the upper hinge connection 13 extends substantially the full length of the hood and an opening for the reception of the radiator filler neck has been dispensed with entirely.

In Figures 7 to 9 inclusive the hood is made of five sections longitudinally hinged together. With this construction the upper section 30 is at the center and is stationary. Preferably, it is secured at its rear end to the cowl 4 and is provided adjacent its forward end with an opening 31 for receiving the upstanding filler neck 32 of the radiator. The outer top sections 33 and 34 respectively are hingedly connected to the center section 30 and the side sections 35 and 36 are hingedly connected to the outer top sections 33 and 34. Preferably all the side hinge connections illustrated in Figures 1 to 9 inclusive are inset, i. e., the hinges have their axes upon the inner sides of the sections and open outwardly, for instance as illustrated in Fig. 4, so that the side sections of the hood may be readily folded when opened without interference of the radiator framing formed by inturned portions of the hood and will provide a neat outward appearance when closed.

In each instance as illustrated in Figures 1 to 9 inclusive the depth of the hood 5 is less than the depth of the radiator 3. In other words, the hood 5 terminates above the side rails 1 and 2 of the chassis while the radiator 3 has an extension or portion at its lower end disposed between and depending below the chassis side rails 1 and 2. Preferably this depending portion of the radiator is provided with framing 40 which corresponds to and in effect constitutes a depending extension of the framing formed by the returned bent portions $5^1$, $5^2$, and $5^3$ of the hood. As shown, this framing 40 is carried by the radiator 3; however it may be secured to the chassis. In each instance the framing comprises the marginal return bent portions of a separate sheet metal plate.

Certain motor vehicles, using air cooled motors, do not have a radiator at the front end of the hood but instead have a device which forms a closure for the front end of the hood and that usually simulates the appearance of a radiator of a motor vehicle using water cooled motor, therefore, when applying this invention to the motor vehicles with air cooled motors, the closure for the front of the hood would take the place of and be framed in a manner similar to the ordinary radiator shown and described herein.

Thus from the foregoing description it will be apparent that an extremely neat appearance can be secured without involving accuracy in radiator contour and that due to the elimination of the radiator shell, a substantial saving in the cost of manufacturing such parts has been effected.

While it is believed that from the foregoing description the nature and advantages of the invention will be readily apparent, we desire to have it understood that we do not limit myself to what is herein shown and described, and that such changes may be resorted to when desired as fall within the scope of what is claimed.

What we claim as our invention:

1. In a motor vehicle, a part simulating a radiator, and an engine hood having top and side sections extending over and in advance of said part, the joints between said top and side sections extending longitudinally of the hood and disposed at opposite sides of said part, said joints including hinges extending inwardly from said top and side sections, and flanges projecting laterally inwardly from the forward ends of said top and side sections, and overlying and constituting a framing for the front face of said part, the axes of said hinges being within the hood approximately in vertical alignment with the inner edges of the side section inturned flanges aforesaid.

2. A motor vehicle engine hood structure including two side panels and two top panels, hinges connecting said side panels to said top panels, said side and top panels being inturned at their respective front ends to form a framing for the frontal opening of said hood, and the hinges between said side and top panels having axes lying adjacent the inner edges of the framing aforesaid.

In testimony whereof we affix our signatures.

ALANSON P. BRUSH.
WILLIAM A. BRUSH.